(12) United States Patent
Natarajan et al.

(10) Patent No.: US 7,194,544 B2
(45) Date of Patent: Mar. 20, 2007

(54) METHOD AND SYSTEM FOR DYNAMIC PROTOCOL SELECTION AMONG OBJECT-HANDLED SPECIFIED PROTOCOLS

(75) Inventors: Vijaykumar Natarajan, Mountain View, CA (US); Vishwanath Kasaravalli, Hayward, CA (US); Goerge Mark Scott, Sunnyvale, CA (US)

(73) Assignee: Borland Software Corporation, Valley, CA (US)

( * ) Notice: Subject to any disclaimer, the term of this patent is extended or adjusted under 35 U.S.C. 154(b) by 524 days.

(21) Appl. No.: 09/736,953

(22) Filed: Dec. 14, 2000

(65) Prior Publication Data

US 2002/0078211 A1 Jun. 20, 2002

(51) Int. Cl.
*G06F 15/16* (2006.01)
*G06F 15/167* (2006.01)

(52) U.S. Cl. ........................ 709/228; 709/201; 709/217

(58) Field of Classification Search ........ 709/217–231, 709/200–204, 201; 713/200; 717/102, 108, 717/116, 165; 719/315–317, 310, 330–332; 707/103; 718/100
See application file for complete search history.

(56) References Cited

U.S. PATENT DOCUMENTS

| | | | |
|---|---|---|---|
| 5,862,325 A * | 1/1999 | Reed et al. | 709/201 |
| 5,915,113 A * | 6/1999 | McDonald et al. | 717/109 |
| 6,208,952 B1 * | 3/2001 | Goertzel et al. | 709/230 |
| 6,282,652 B1 * | 8/2001 | Scheifler | 713/200 |
| 6,345,361 B1 * | 2/2002 | Jerger et al. | 713/200 |
| 6,453,320 B1 * | 9/2002 | Kukura et al. | 707/103 R |
| 6,519,647 B1 * | 2/2003 | Howard et al. | 709/229 |
| 6,542,964 B1 * | 4/2003 | Scharber | 711/122 |
| 6,601,233 B1 * | 7/2003 | Underwood | 717/102 |
| 6,633,923 B1 * | 10/2003 | Kukura et al. | 719/316 |
| 6,766,335 B2 * | 7/2004 | Kukura et al. | 707/204 |
| 6,785,229 B1 * | 8/2004 | McNiff et al. | 370/230 |
| 6,847,992 B1 * | 1/2005 | Haitsuka et al. | 709/218 |
| 2001/0039565 A1 * | 11/2001 | Gupta | |
| 2002/0022453 A1 * | 2/2002 | Balog et al. | 455/41 |
| 2002/0026514 A1 * | 2/2002 | Ellis et al. | |
| 2002/0069174 A1 * | 6/2002 | Fox et al. | |
| 2003/0039237 A1 * | 2/2003 | Forslow | 370/352 |
| 2003/0105723 A1 * | 6/2003 | Skea | 705/64 |
| 2003/0214943 A1 * | 11/2003 | Engstrom et al. | 370/353 |

OTHER PUBLICATIONS

General Inter-ORB Protocol (GIOP) and derivatives, Jan. 24, 2005, pp. 1-9.*
Flexible Support of ORB Interoperability, N. Fischbeck, E. Holz, O. Kath, 1999, pp. 1-8.*

(Continued)

*Primary Examiner*—Larry D. Donaghue
*Assistant Examiner*—Haresh Patel
(74) *Attorney, Agent, or Firm*—Darby & Darby

(57) ABSTRACT

The bidding method for selecting a protocol involves generating a bid for each protocol and ranking the bids in a prescribed order such that the order of the bids reflects the order of preference among the protocols. Thereafter, the most preferred protocol is executed or processes to establish the intended communication. If for some reason the more preferred protocol is unsuccessful, the next best protocol according to the order of the bids is processed. The bids are generated according to system/user set configuration and target object constraints. Bids fall into ranges of bid values where each range indicates a certain priority and associated rules.

12 Claims, 3 Drawing Sheets

OTHER PUBLICATIONS

Transmission Control Protocol, DARPA Internet Program, Protocol Specification, Defense Advanced Research Projects Agency, Information Processing Technique Office, Information Sciences Institute, University of Southern California, Sep. 1981, pp. 1-84 (89 sheets).

The SSL Protocol, Version 3.0, Transport Layer Security Working Group, Nov. 18, 1996, pp. 1-63 (59 sheets).

The Common Object Request Broker Architecture: Core Specification, CORBA, Object Management Group, Oct. 2000, Version 2.4, Chapters 13 and 15.

* cited by examiner

METHOD AND SYSTEM FOR DYNAMIC PROTOCOL SELECTION AMONG OBJECT-HANDLED SPECIFIED PROTOCOLS

FIELD OF THE INVENTION

The invention relates to network communication, specifically to selecting a protocol for the network communication.

BACKGROUND OF THE INVENTION

In a computer network system employing object technology, services are handled by objects. Objects are independent program modules that may include data as well as functionality. Objects may communicate using a common interface called an object request broker ("ORB") designed according to Common Object Request Broker Architecture ("CORBA"). CORBA is an industry standard architecture for distributed objects. In CORBA, the client makes a request to the ORB which directs the request to the appropriate server and redirects the results back to the client. Each object is identified by an object handle called an interoperable object reference ("IOR"). Typically, an object is located at the server and the client only has the IOR. The same object may be located on several computers but may nevertheless have only one IOR. Upon issuance of a request for an object by way of IOR, the ORB will determine which instance of the object to reference. If an object is co-located at the client, the ORB would typically attempt to use the co-located object preserving efficiency of resources. However, if there is no co-located object or for some reason it is not usable, the ORB uses the information contained in the IOR to communicate to an appropriate server where an instance of the object is located.

Once the ORB determines the remote location for the targeted object, (the object is not located on the computer requesting the object), communication must be established between the two computers. Network communication is established using protocols, which are the rules governing transmitting and receiving of data. Typical protocols include TCP/IP (Transmission Control Protocol/Internet Protocol), ATM (Asynchronous Transfer Mode), HTTP (Hyper Text Transport Protocol), and IIOP (Internet Inter-ORB Protocol). For secure communications, SSL (Secure Sockets Layer) may be employed in conjunction with another protocol.

A remote object reference in a distributed environment may contain a multitude of protocols and/or connectivity options. A client that is attempting communication must select one of these options to establish the connection with the remote object. There may be many constraints and variables associated with such a selection: client middleware infrastructure's support for certain protocols; client or user privileges to use certain communication channels; user preferences for communication channel characteristics; and relative efficiency of protocols. The IOR may identify the one or more protocols that the object it represents recognizes and is able to use. Where more than one protocol is specified, a selection process is needed to determine which protocol to employ. Conventionally, the ORB made this determination by trying different protocols in random order or in a predefined static order. For example, the order may be defined as the order in which the protocol modules were registered or initialized with the system. Another approach is to specify an order of preference among the potential protocols so that the order is fixed at the time of compilation.

What is needed is a more strategic method for selecting protocols. In addition what is needed is a flexible method where the basis for the selection may be set by the user. This invention satisfies these and other needs.

SUMMARY OF THE INVENTION

The bidding method for selecting a protocol involves generating a bid for each protocol, ranking the bids in a prescribed order, and then using the best protocol according to the ranking. If for some reason the best protocol is unsuccessful, use the next best protocol, processing the protocols in the order of the bid ranking. A typical ranking is the lowest value bid takes the highest ranking.

Using a bidding process for selecting a protocol, allows for introduction of varying degrees of flexibility in determining the protocol. The bidding process may account for variables and constraints such as client middleware infrastructure's support for certain protocols; client or user privileges to use certain communication channels; user preferences for communication channel characteristics; and relative efficiency of protocols. The effect of implementing the bidding process of the present invention is a dynamic protocol selection process. In addition, protocol modules may be added or removed without requiring any redesign or adjustment of the selection process.

To provide the user with control over the selection process, the configuration associated with the client or with the application is designed to include one or more properties that may be set by the user. Properties may indicate, for example, to always use a secure method of communication or always use a proxy. If a property is set indicating exclusive use of a certain protocol, then protocols not satisfying the properties will not be selected.

Further dynamic protocol selection is achieved by conceptually dividing the ranking into ranges where each range is defined by a rule to achieve a certain priority/preference ranking. Bid values are determined based on the profiles in the IOR and configuration set by the user. The bids inherently fall into one of the prescribed ranges indicating the priority level associated with the protocol represented by the bid. There may be, for example, a range indicating exclusivity. If there are any bid falling within the exclusivity range, the associated protocols will be tried but protocols associated with bids in any lower priority range will not be tried. There may be, for another example, a range indicating critical protocols. Protocols associated with bids in the critical range will be tried first. The configuration contains several settings for the user to define the desired priority among the protocols. The settings may take the form of list of protocols falling within a desired priority. For example, the configuration may include a critical protocols list where the user specifies those protocols that must be tried first. Another list may indicate the protocols that are to be tried exclusively. The user may also define a priority for ordering protocols falling within a single range.

DETAILED DESCRIPTION OF THE PREFERRED EMBODIMENT

Figure 1:
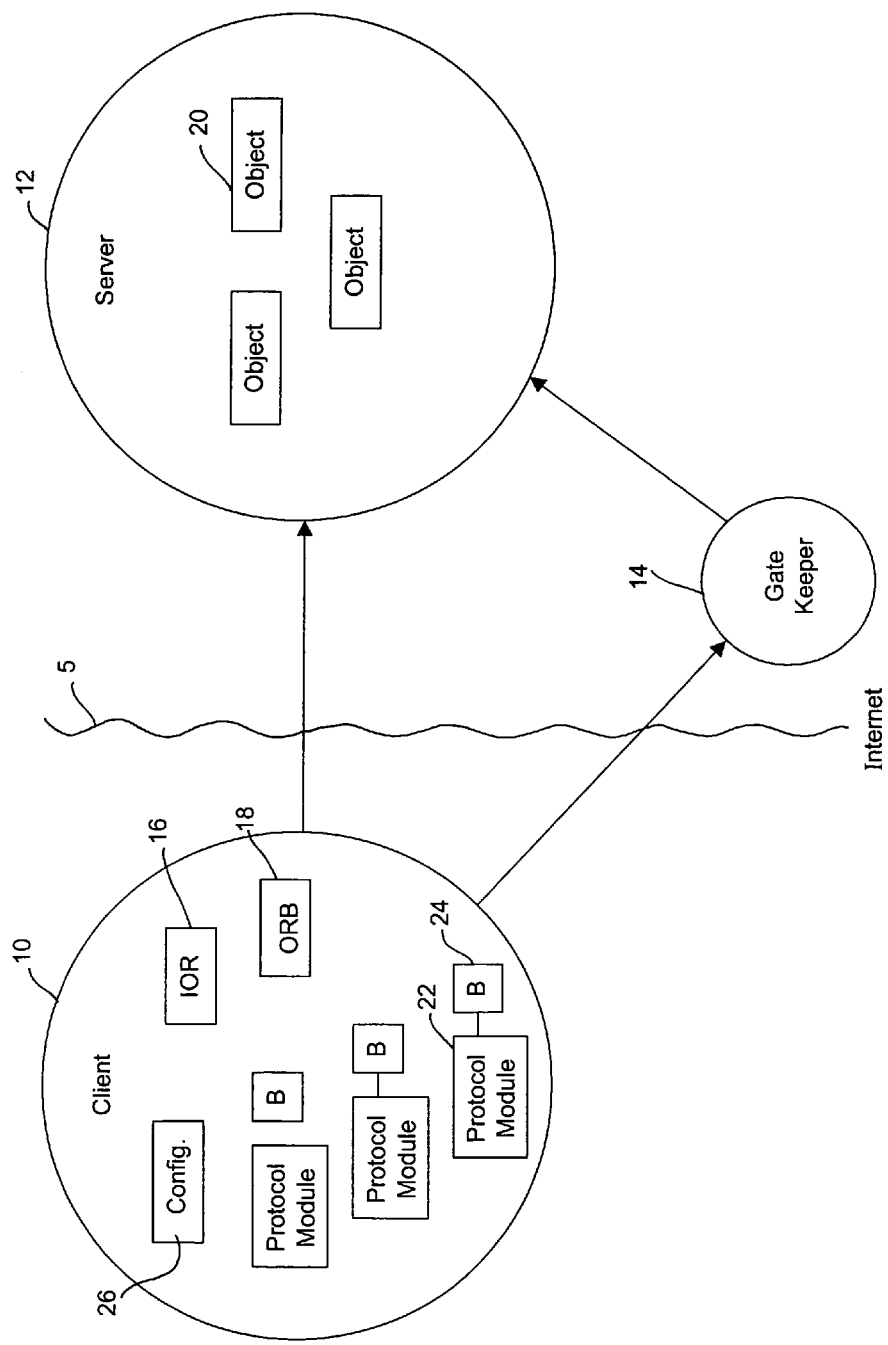
FIG. 1 shows an environment for the preferred embodiment of the present invention.
Figure 2:
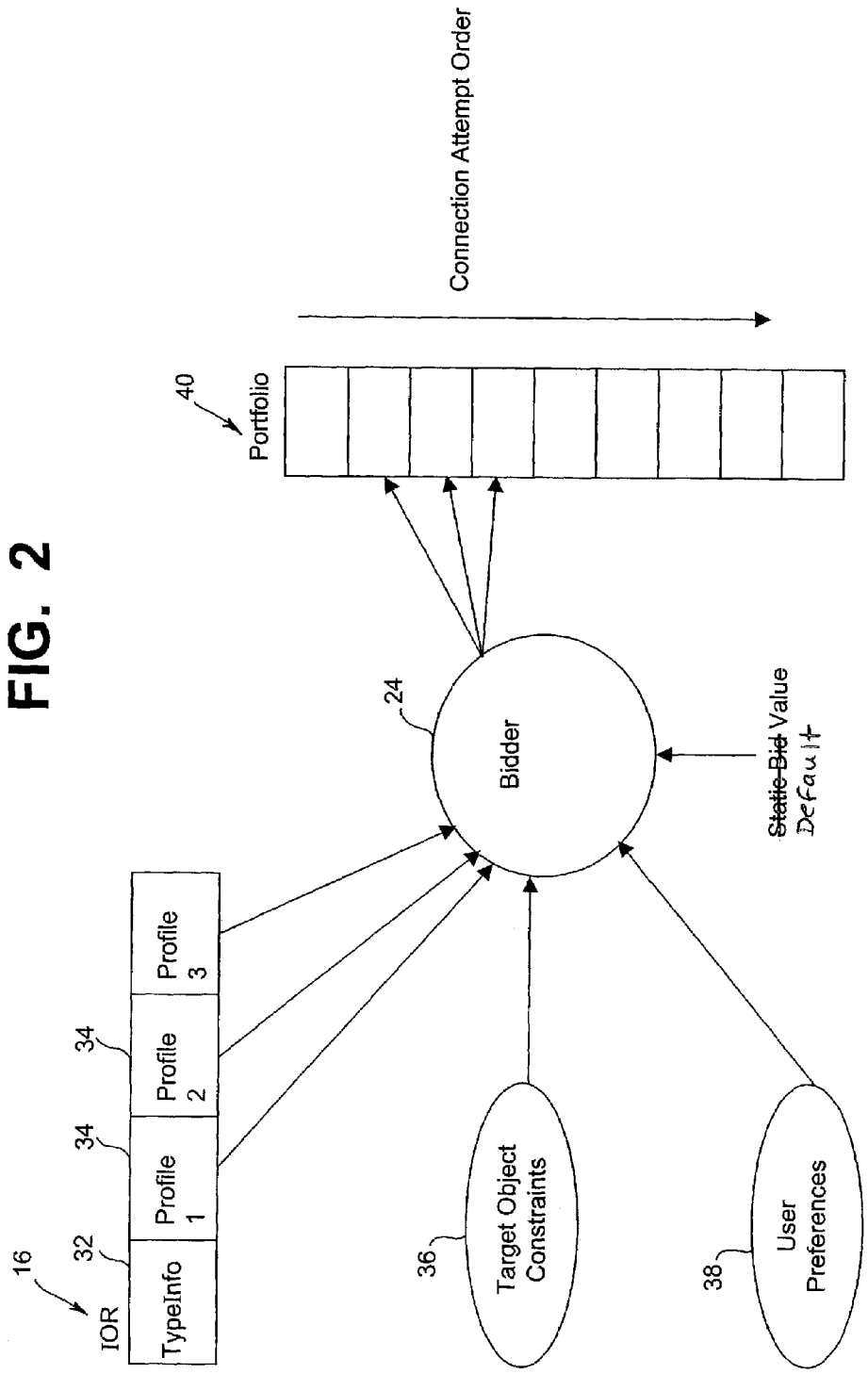
FIG. 2 shows an embodiment of the present invention.
Figure 3:
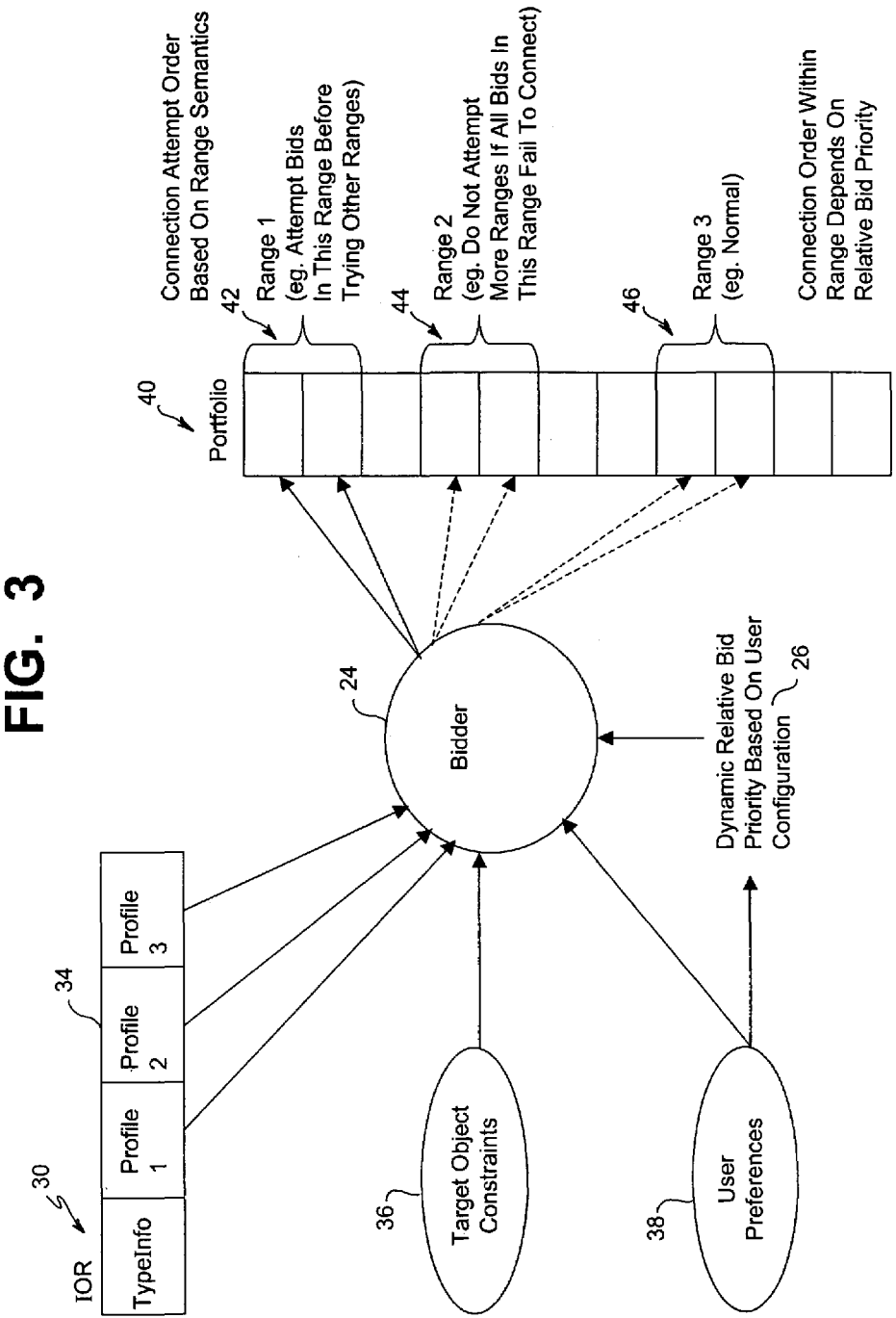
FIG. 3 shows a preferred embodiment of the present invention.

Referring to FIGS. 1 and 2, during the course of processing of an application at a client 10, the need arises to invoke a specific object 20 remotely located at the server 12. The IOR interoperable object reference) 16 associated with the targeted object is pushed to the ORB (object request broker) 18. The IOR contains information 32 about the type of object being referenced and one or more profiles 34. Each profile represents a protocol, i.e., a way to contact another computer, typically a server. IIOP and TCP are typical protocols. For secure communication IIOP/SSL is a typical protocol. A profile may contain one or more components. Components are typically communication processes that perform on top of or in conjunction with a protocol. For example, where communication must pass a proxy such as a firewall, the proxy server is indicated as a component of the profile, and the specified protocol, e.g. IIOP, will operate under or using the gatekeeper. Another example is where the communication must be secure, SSL may be indicated as a component to be used with a protocol e.g. TCP. The term protocol is used broadly so as to include components such as a proxy server and SSL as well as independent protocols such as TCP and IIOP. At the client there are protocol modules 22 each containing the instructions (i.e. code) for operating a particular protocol to establish communication between the two computers (e.g., client and server). Furthermore, each protocol module has an associated bidder 24, containing logic for generating a bid according to the IOR 16, the setting of the configuration 26, user preferences 38 and target object constraints 36. Target object constraints are name value pairs, for example, "always secure, true" is an example of a typical target constraint.

When the ORB at the client receives the IOR specifying multiple protocols, it must determine which protocol to use. The one or more protocols are individually identified in the IOR in its profiles. Each protocol bidder checks the profiles in the IOR to determine whether it recognizes any of them. If it recognizes one of the profiles it submits a bid. If it does not recognize any of the profiles, it does not submit a bid. Alternatively, the ORB solicits bids from each protocol bidder that is registered with the ORB.

Each protocol bidder determines the value of the bid to submit either from the information previously defined by the user in its configuration 26 or by using the default value. The default values are assigned to the protocol modules or bidders at the time the protocol module is established.

If the user wants to specify that certain protocol be used under certain circumstances, the user sets the configuration 26 at the client. The configuration includes properties that relate to the use of the protocols. The user specifies how the protocols should be used by setting these properties in the configuration. For example, if the user wants to specify that all communications must be transmitted over a secure protocol, the user sets the always_secure property. Another property, called always_proxy, indicates that all communications must pass through the gateway.

The bid value is determined based on the properties settings in a predefined manner. If always $_{13}$ secure is set then SSL protocol submits a very low value, so that it gets priority over the other protocols. In addition, if always secure is set then the protocols that do not provide secure communication will not submit a bid because otherwise, if the SSL protocol fails then an insecure protocol will be tried, contrary to the property setting. If no properties are set or if a protocol is not affected by the specified properties, then the default values are submitted. Instances where a protocol does not submit a bid include where the property settings preclude the protocol or where the protocol does not recognize the definitions in the profiles.

The submitted bids are entered into a table called a portfolio. The bids are typically ordered in ascending order. To establish a connection to the server, the protocol associated with the lowest bid (highest preference or priority) is processed. If communication fails, the ORB processes the protocol associated with the next bid in the portfolio.

In a preferred embodiment, the portfolio is subdivided into a plurality of ranges. Each range is associated with a predefined rule reflecting its priority relative to the other ranges. For example there may be three ranges, named critical, exclusive, and normal. The critical range is defined by the rule that the protocols submitting bids within this range have the highest priority and are to be tried first. An in-process (i.e., a co-located object) transport is typically assigned a bid within the critical range. The exclusive range is defined by the rule that the protocols submitting bids within lower ranking ranges are not processed even if all the exclusive protocols are unsuccessful. For example, SSL is typically assigned a bid within exclusive range. The normal range is defined so that only if there are no bids submitted to the exclusive range will the protocols in the normal range be processed.

To implement this range system, the configuration has settings in addition to or instead of properties. The configuration provides for an order list of protocols where the user may define the order of priority among protocols that bid within a single range. In addition, the configuration provides for user defined lists for each range other than normal. Continuing with the example of three ranges described above, the configuration includes an exclusivity list and a critical list.

When determining a bid value for a protocol, the protocol bidder references the configuration 26, target object constraints 36, and user preferences 38. If the protocol is listed on the exclusivity list, then the bid value will be set within the exclusivity range 44 and entered into the portfolio 40. If a protocol is listed on the critical list, the associated bid value will be within the critical range 42. For protocols not listed, the bid value will be set within the normal range 46. Finally, the priority list is referenced and the bid values within a range are adjusted so that the order defined by the priority list is preserved. It should be understood by one skilled in the art that determining the bid value may be performed in one step or a series of steps without any impact on the invention.

Since the selection of protocols is determined by the configuration which may be defined by the user, the selection process is dynamic in contrast to a process fixed at the time the application at the client is compiled.

While the invention has been particularly shown and described with reference to a preferred embodiment thereof, it will be understood by those skilled in the art that various changes in form and details may be made therein without departing from the spirit and scope of the invention.

What is claimed is:

1. A method for selecting one protocol from among a plurality of protocols to establish one or more communications sessions between a first computer and a second computer, where the first computer has an object and the second computer has an object-handle associated with the object, and where the object-handle identifies the plurality of protocols, the method comprising the steps of:

a) defining a plurality of ranges so that each of the ranges represents a priority rule;
b) determining the priority rule that applies to each of the plurality of protocols respectively identified in the object-handle based on a configuration for the second computer;
c) upon invocation on the second computer of the object handle for each of said one or more communication sessions, generating bids having bid values for one or more protocols among the plurality of protocols identified by the object-handle, wherein each of the bid values is in one of the ranges that represents the priority rule;
d) dynamically arranging the bid values in a sequence corresponding to their relative values so as to indicate a relative preference among the plurality of protocols for each of said one or more communications sessions; and
e) parsing the arranged bid values to select a highest protocol that is the highest preference according to the sequence and is effective in establishing each of said one or more communications sessions.

2. The method as in claim 1, wherein the generating step further comprises the steps of:
a) for each of the one or more protocols among the plurality of protocols, determining whether the one or more protocols qualifies according to the configuration; and
b) when the one or more protocols qualifies, setting the bid value for the one or more protocols according to the configuration.

3. The method as in claim 1, wherein the configuration includes a default value associated with each of the one or more protocols, and the generating step further comprises the step of setting the bid value for each of the one or more protocols equal to the default value on the condition that no other bid value for each of the one or more protocols is determined.

4. The method as in claim 1, wherein the configuration includes at least one property relating to the one or more protocols among the plurality of protocols, wherein the at least one property has an enabled and disabled state, and wherein the at least one property is associated with a bid range, the method further comprising the steps of:

a. referencing a the at least one property; and
b. setting the a bid value for the one or more protocols relating to the at least one property equal to a value within the bid range associated with the at least one property when the at least one property is in the enabled state.

5. The method as in claim 4, further comprising the step of setting the at least one property to the enabled or the disabled state based on signals from a user operating the second computer.

6. The method as in claim 1, wherein the arranging step further comprises a step of determining that one of the bid values with a lowest value is the most preferred and one of the bid values with a highest value is the least preferred.

7. The method as in claim 1, wherein the sequence of the bid values is ascending order.

8. The method as in claim 1, wherein the generating step further comprises the steps of:
a. referencing a predefined configuration that is associated with the second computer; and
b. setting a bid equal to a value within one of a plurality of prescribed ranges according to predefined rules in the configuration.

9. The method as in claim 8, wherein the configuration includes a priority list, and the generating step further comprising the step of adjusting the bid values within a single range according to the priority list specified in the configuration.

10. The method as in claim 8, wherein the parsing step further comprises the step of determining one or more conditions associated with the plurality of prescribed ranges such that the bid values within each of the plurality prescribed ranges are parsed when the associated conditions are satisfied.

11. The method as in claim 10, wherein the ranges include an exclusivity range with an associated condition that if there is at least one bid value within the exclusivity range, the bid values within ranges having lower preference than exclusivity range are not parsed.

12. The method as in claim 10, wherein the ranges include a critical range with an associated condition such that the bid values within the critical range are parsed before the bid values in the ranges other than the critical range are parsed.

* * * * *

UNITED STATES PATENT AND TRADEMARK OFFICE
CERTIFICATE OF CORRECTION

PATENT NO. : 7,194,544 B2
APPLICATION NO. : 09/736953
DATED : March 20, 2007
INVENTOR(S) : Vijaykumar Natarajan et al.

It is certified that error appears in the above-identified patent and that said Letters Patent is hereby corrected as shown below:

On the Title Page (73)

In the Assignee:

Please delete "Borland Software Corporation, Valley CA (US)" and insert -- Borland Software Corporation, Scotts Valley, CA (US)--

Signed and Sealed this

First Day of May, 2007

JON W. DUDAS
*Director of the United States Patent and Trademark Office*